(No Model.)

R. ARMSTRONG.
CATTLE GUARD.

No. 263,458. Patented Aug. 29, 1882.

WITNESSES:

INVENTOR:
R. Armstrong
BY
ATTORNEYS.

UNITED STATES PATENT OFFICE.

ROBERT ARMSTRONG, OF NEODESHA, KANSAS.

CATTLE-GUARD.

SPECIFICATION forming part of Letters Patent No. 263,458, dated August 29, 1882.

Application filed June 12, 1882. (No model.)

*To all whom it may concern:*

Be it known that I, ROBERT ARMSTRONG, of Neodesha, Wilson county, Kansas, have invented a new and Improved Cattle-Guard, of which the following is a full, clear, and exact description.

The object of my invention is to prevent cattle from passing on railroad-tracks or from passing through openings in fences.

The invention consists in a vertically-swinging gate pivoted to suitable standards, and having its lower end jointed or hinged to one end of a platform, having its opposite end hinged to a crank-shaft journaled in short standards, whereby when an animal steps on this platform the gate will be swung upward toward the animal and will stop the animal. The platform can be provided at its inner end with a projection which strikes against the rail and forms a check for the movements of the platform.

Reference is to be had to the accompanying drawings, forming part of this specification, in which similar letters of reference indicate corresponding parts in both figures.

Figure 1:
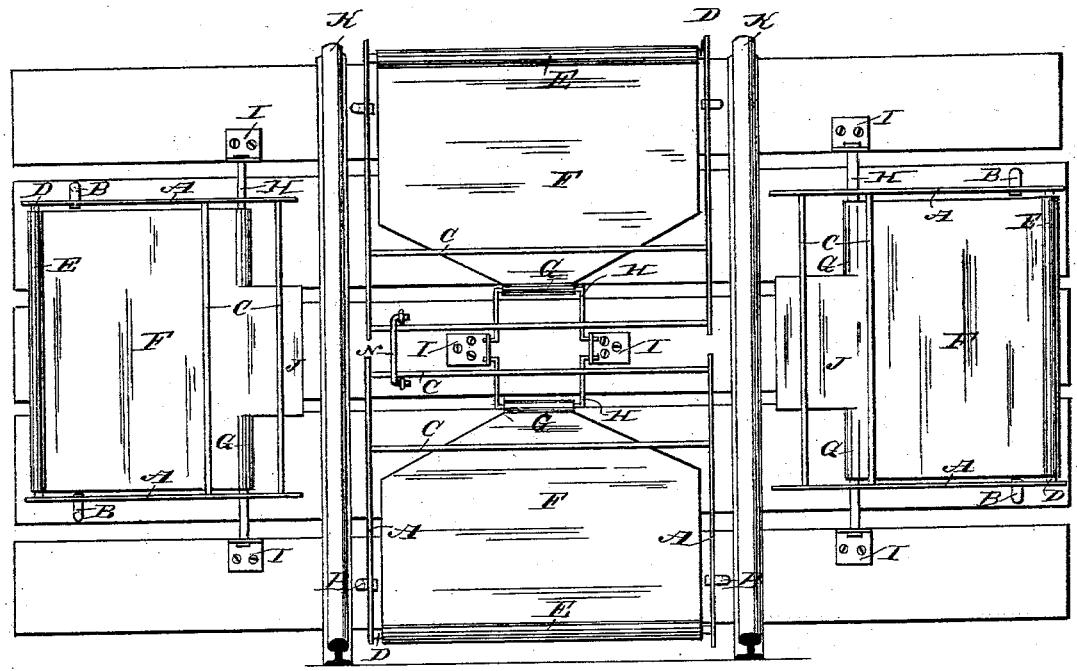
Figure 2:
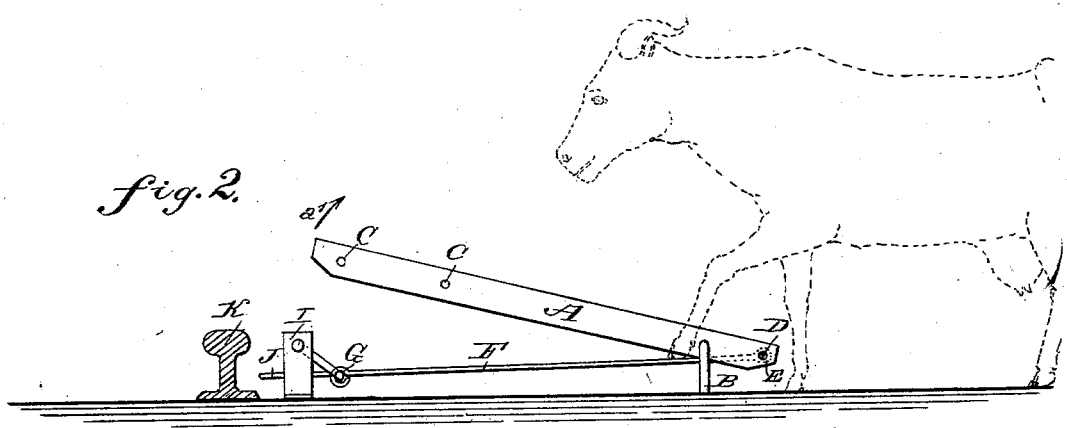

Figure 1 is a plan view of my improved cattle-guard, and Fig. 2 is a detail longitudinal elevation of part of the same.

Two bars, A, are pivoted to short standards B, and these bars are connected at the ends opposite those that are pivoted by one or more rods, C, whereby a vertically-swinging gate is formed. These bars A are connected at the opposite ends by a rod, D, which passes through a longitudinal loop, E, at one end of a plate or platform, F, and at the opposite end of this platform F a loop, G, is formed, through which a rod, H, passes, which has short cranks at the ends, which are pivoted in standards I, resting on a base-platform or on the sleepers of the track, so that the platform F can swing forward and backward. At the inner end of the platform F a part, J, of this platform projects, which forms a check which is to strike against the rails K.

One of the above-described guards is arranged at each side of the track in the roadway. That end of the guard at the rod D is the outer end of the same, and is the greatest distance from the rails. Thus, if an animal approaches the rails, it will first step on the outer end of the platform, and thereby the end of the rod D will be moved downward, and consequently the inner end of the swinging gate A C will be swung upward in the direction of the arrow *a'* and in the way of the animal, which is thus prevented from moving on.

It frequently occurs that animals pass through openings in the fences, crossing the tracks, and want to walk along the track. To prevent this guards like those described above are arranged between the rails; but these platforms need not be provided with a check-projection, J.

The guard can be made of wood and metal or entirely of metal, as may be desired.

If the gates are to be held down for any purpose whatever, they can be held by a hook on the base; or a double hook, N, can be passed over the end rods, C, of two adjoining gates, as shown in Fig. 1.

Having thus described my invention, I claim as new and desire to secure by Letters Patent—

1. A cattle-guard constructed substantially as herein shown and described, and consisting of a vertically-swinging gate hinged at one end to the end of a horizontally swinging or moving platform, substantially as herein shown and described.

2. In a cattle-guard, the combination, with the gate A C D, pivoted at one end to short standards B, of the platform F, hinged to the end of this gate, and having its opposite end hinged on a crank-shaft, H, journaled in standards I, substantially as herein shown and described, and for the purpose set forth.

3. In a cattle-guard, the combination, with a gate formed of side bars, A, and cross-rods C D, of the short standards B, to which this gate is pivoted, the platform F, hinged to this gate, the crank-shaft H, to which the opposite end of the platform F is hinged, and of the standards I, substantially as herein shown and described, and for the purpose set forth.

4. In a cattle-guard, the combination, with the pivoted swinging gate A C D, of the platform F, hinged thereto, and provided at its inner end with a projection, J, and the journaled crank-shaft H, substantially as herein shown and described, and for the purpose set forth.

ROBERT ARMSTRONG.

Witnesses:
 A. K. PHELON,
 G. W. KENT.